United States Patent [19]
Martin

[11] Patent Number: 5,214,945
[45] Date of Patent: Jun. 1, 1993

[54] LOCKING ASSEMBLY FOR USE ON A NUT OR BOLT HEAD

[76] Inventor: Kenneth B. Martin, P.O. Box 14710, Grover City, Calif. 93406

[21] Appl. No.: 897,984

[22] Filed: Jun. 16, 1992

[51] Int. Cl.⁵ ............................................. F16B 41/00
[52] U.S. Cl. ....................................... 70/232; 70/167; 70/386; 70/DIG. 57
[58] Field of Search ......... 70/386, DIG. 57, 229-232, 70/32-34, 259, 260, 158, 163-173

[56] References Cited

U.S. PATENT DOCUMENTS

| | | | |
|---|---|---|---|
| 1,692,825 | 11/1928 | Ganz | 70/232 |
| 1,764,367 | 6/1930 | Szymanski | 70/260 |
| 1,870,427 | 8/1932 | Stallings et al. | 70/231 |
| 1,912,872 | 6/1933 | Trautner | 70/231 X |
| 3,423,971 | 1/1969 | Brunelli | 70/168 |
| 3,653,236 | 4/1972 | Kerr | 70/386 X |
| 3,975,935 | 8/1976 | Masterson | 70/232 |
| 4,269,048 | 5/1981 | McDorman | 70/231 X |

FOREIGN PATENT DOCUMENTS

| | | | |
|---|---|---|---|
| 800104 | 9/1950 | Fed. Rep. of Germany | 70/232 |
| 933523 | 4/1948 | France | 70/232 |
| 289020 | 7/1928 | United Kingdom | 70/230 |

*Primary Examiner*—Lloyd A. Gall
*Attorney, Agent, or Firm*—Daniel C. McKown

[57] ABSTRACT

A locking assembly used to deny access to a nut or to a bolt head to prevent theft of an article that is bolted to a body such as a vehicle. The locking assembly includes a retainer through which the bolt passes and that partially surrounds the nut or bolt head that secures the retainer to the body. The retainer includes a groove that extends circumferentially around it. The locking assembly also includes a housing that fits over the retainer and that is selectively engaged to the retainer by a ball bearing that is pushed into the groove on the retainer when a key turns the shaft of a lock which turns a cam that pushes the ball bearing into the groove. The locking assembly has an exceptionally low profile, made possible by positioning the lock perpendicular to the axis of the bolt. Further strength is imparted to the locking assembly by the fact that the retainer is almost as deep in the axial direction as the housing, and the strength of the retainer reinforces the housing.

12 Claims, 3 Drawing Sheets

LOCKING ASSEMBLY FOR USE ON A NUT OR BOLT HEAD

BACKGROUND OF THE INVENTION

1. Field of the Invention

The present invention is in the field of security devices and specifically relates to a locking assembly that can be used to deny access to a nut or to a bolt head, to prevent theft of an article through which the bolt passes.

2. The Prior Art

The purpose of the locking assembly is to prevent an otherwise exposed nut or bolt head from being unscrewed without first unlocking and removing the locking assembly. The locking assembly surrounds the nut or bolt head that it protects. In the present invention, the locking assembly consists of two parts: a retainer through which the bolt passes, and an access-denying housing that locks onto the retainer by means of a lock included within the housing. Access to the nut or bolt head can be gained only by unlocking and removing the housing and this requires a key that is made available only to authorized users.

Devices of this general nature have long been used in the automotive field to prevent theft of spare wheels and other exposed accessories.

In a contemporary example distributed in the United States by Carrani Companies, Inc. of Gardena, Cal., a wheel lug nut holds a retainer and the wheel to be protected on a stud, and a housing fits over the wheel lug nut and the retainer, and locks to the retainer by means of a lock that is included within the protective housing.

In its external appearance the Carrani device bears some similarity to the devices shown in the Trautner and in the Brunelli patent to be discussed below.

In U.S. Pat. No. 1,912,872, Trauntner shows a tire lock for use on motor vehicles, in which the axis of the lock is parallel to the axis of the bolt. As the key is turned, a finger is rotated to extend into a groove on a retainer portion.

In U.S. Pat. No. 3,423,971, Brunelli shows a lock for use on the wheel of an automobile, and as with the Trautner device, the axis of the lock is parallel to the axis of the bolt. Instead of a finger, Brunelli uses an offcenter cam which must past through a hole in a plate so as to retain the cover to the plate.

In U.S. Pat. No. 3,975,935, Masterson shows a removable plastic case for protecting a locking device from the weather. The locking device includes a tang that is operated by a keeper.

In U.S. Pat. No. 3,525,242, Young shows a bolt that uses ball bearings but in his lock the locking mechanism extends from and is coaxial with the bolt. In Young's device, the end of the bolt must have a groove for the ball bearings that he uses. Consequently, his device cannot be used to protect a standard nut or bolt.

In U.S. Pat. No 1,870,427, Stallings, et al. show a lock which serves as a nut and must therefore be hexagonal. The lock is coaxial with the axis of the stud and extends from it. This gives the lock a high profile, making it easier to break off.

In U.S. Pat. No. 1,692,826, Ganz shows a lock that is coaxial with the bolt and extends from it. The device is not usable with a standard nut, and it appears that the bolt must include a groove near its end.

Unlike these prior art devices, in the present invention, the axis of the lock may be at any chosen angle with respect to the axis of the bolt. Also, the mechanism used in the present invention is extremely simple and reliable and these features have proven to be highly advantageous.

SUMMARY OF THE INVENTION

It is an objective of the present invention to provide a locking assembly for use on a nut or bolt head for the purpose of preventing theft of the article secured by the nut or bolt head. A further objective of the present invention is to provide a locking assembly of simple and reliable construction.

In accordance with the present invention, the bolt is passed through an aperture in a retainer so that the nut or the bolt head is contained within the retainer. The retainer includes a groove that extends around its circumference. Thereafter, a housing is fitted over the retainer and an object, such as a ball bearing, is pushed into the groove by a cam that is operated by turning the key in the lock. The object prevents the housing from being removed from the retainer, and the housing along with the retainer completely enclose the nut or bolt head to be protected.

The novel features which are believed to be characteristic of the invention, both as to its structure and its operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
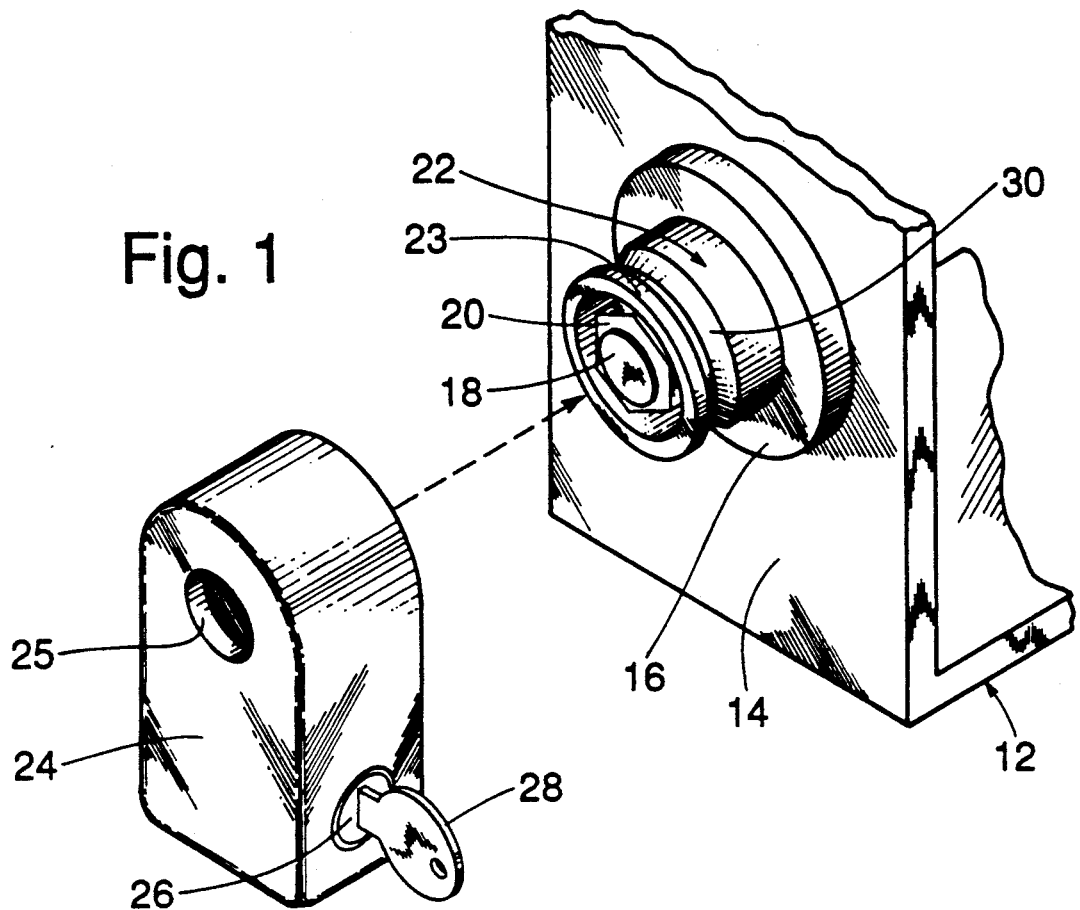
FIG. 1 is a perspective view showing the retainer in place before the housing is applied in a preferred embodiment of the invention.
Figure 2:
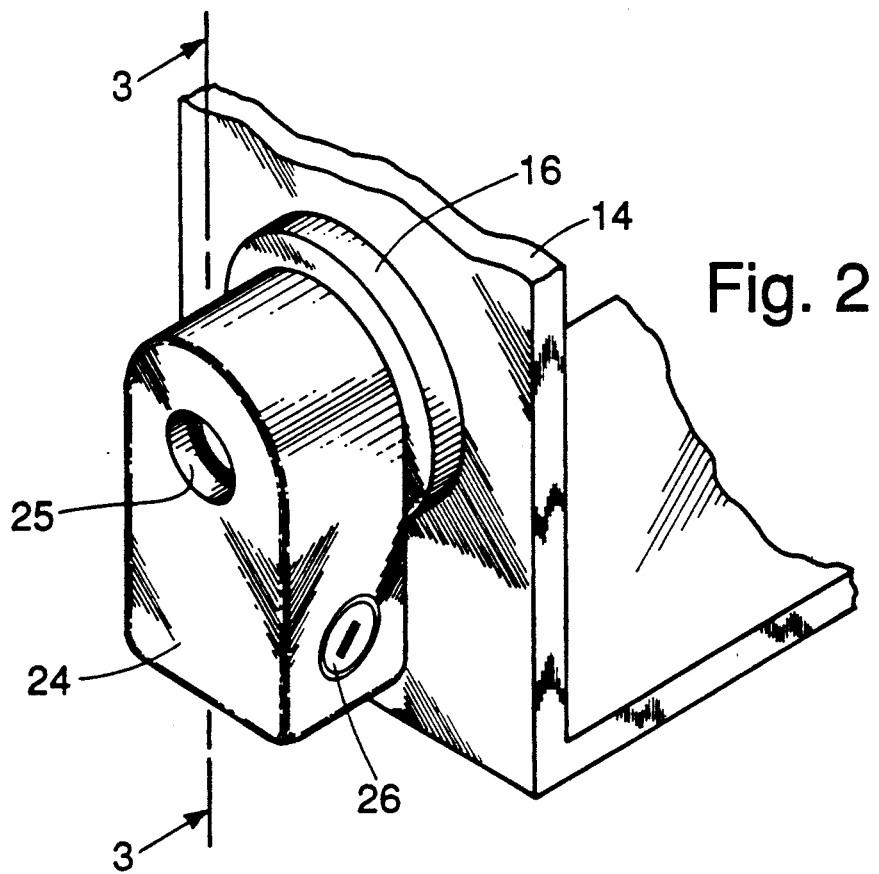
FIG. 2 is a perspective view showing the locking assembly of the present invention in use after the housing has been applied.

FIGS. 1 and 2 show how the locking assembly of the present invention is used to secure an article 16 to a body 12. For convenience, it is assumed that the body 12 includes a plate 14, perpendicular to which a bolt 18 or stud extends for the purpose of securing the article 16 to the body 12. Although the article 16 is shown in the figures as an annular disk for convenience, the article can have any shape so long as it includes a hole through which the bolt 18 can extend. For example, the article 16 may be a spare wheel or an accessory to be secured to the body of a vehicle.

Before the nut 20 is placed on the bolt 18, a retainer portion of the locking assembly, designated generally as 22, is put onto the bolt. The nut 20 prevents the retainer 22 from being removed from the bolt 18. In a preferred embodiment of the invention, there is a sufficient space radially between the nut 20 and the retainer 22 to permit a socket wrench to be placed over the nut 20 to tighten it.

In addition to the retainer 22, the present invention includes a housing 24 having a lock 26 that is operated by a key 28.

FIG. 2 shows the locking assembly after the housing 24 has been secured to the retainer 22. The housing 24 prevents access to the nut 20, and the housing 24 can be removed only by a person having a key that fits the lock 26.

Figure 3:
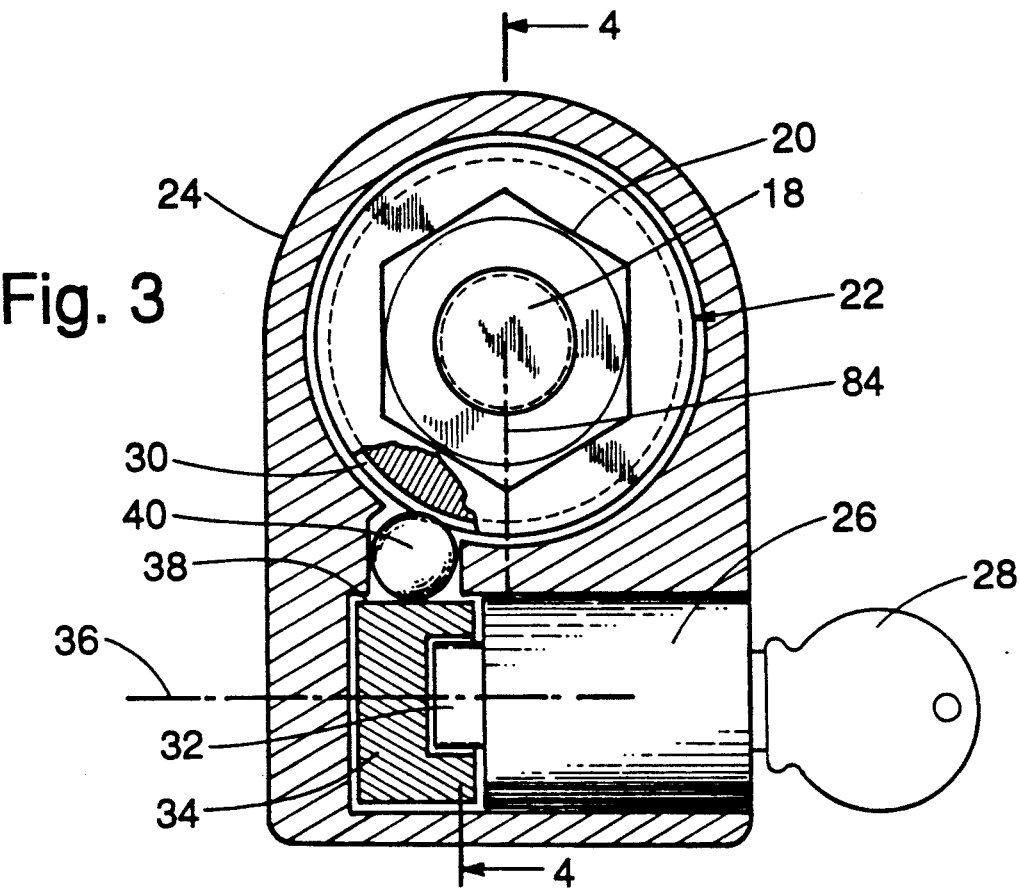
FIG. 3 is a front elevational cross-sectional view in the direction 3—3 indicated in FIG. 2.
Figure 4:
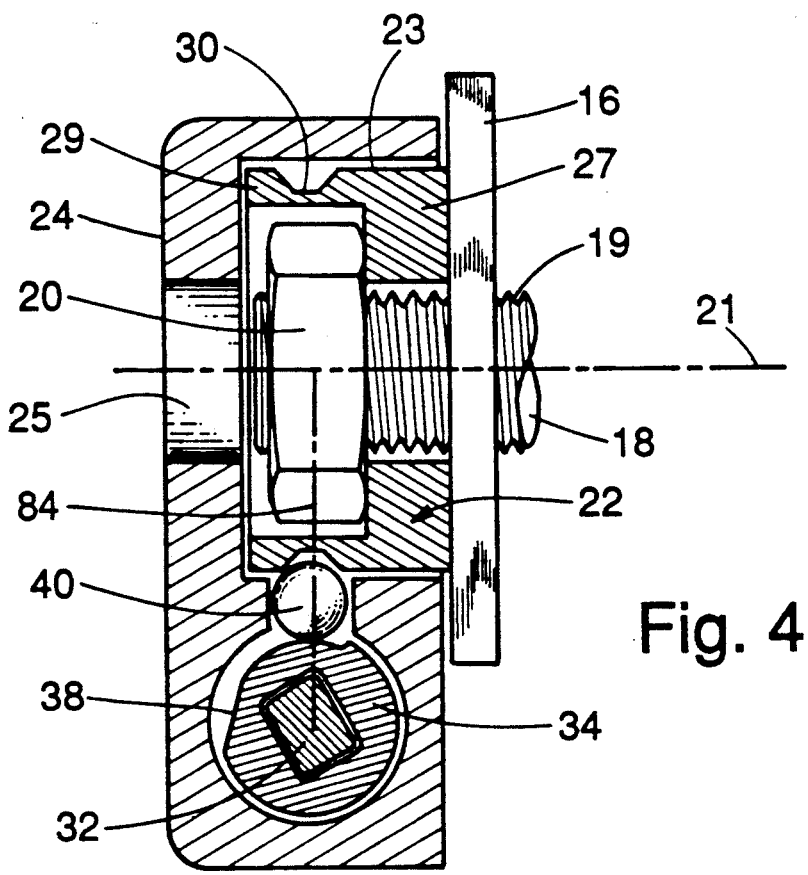
FIG. 4 is a side elevational cross-sectional view in the direction 4—4 indicated in FIG. 3.

FIG. 3 is a cross sectional view in the direction 3—3 indicated in FIG. 2, while FIG. 4 is a cross sectional view in the direction 4—4 indicated in FIG. 3.

An aperture 25 in the housing 24 permits the locking assembly of the present invention to be used in situations where the shank 19 of the bolt extends a substantial distance forward beyond the nut 20.

As seen in FIG. 4, the retainer 22 includes an end plate 27 that lies under the nut or bolt head and a shroud 29 that extends axially from the end plate 27 to encircle the nut or bolt head.

In the preferred embodiment, the shroud 29 has the shape of a hollow cylinder, including a cylindrical outwardly-facing surface 23 that is encircled by a groove 30, as seen in FIGS. 3 and 4. In another embodiment the groove 30 does not extend all the way around the shroud 29 and might be described more accurately as an indentation.

As can be inferred from FIG. 1, the operation of the locking assembly is identical if the direction of the bolt 18 is reversed so that the nut 20 is replaced by the head of the bolt. Such might be the case if the article 16 were being secured to the outside of a vehicle, so that the nut would be inside the vehicle and therefore less readily accessible. Also, there is no inherent reason why access could not be denied to both the nut and the bolt head by the use of two locking assemblies of the type shown.

In the preferred embodiment of FIGS. 3 and 4, the lock 26 includes a shaft 32 of rectangular cross section, and the shaft 32 extends into the cam 34 so that when the shaft is turned by turning the key 28, the cam also will rotate about the axis 36 of the lock.

The cam 34 includes a cam surface 38 of FIG. 4.

When the key 28 is turned, the shaft 32 turns with it, also turning the cam 34. As the cam 34 rotates about the axis 36, the cam surface 38 pushes the ball bearing 40 into the groove 30 of the retainer, whereby the retainer is captured by the housing 24. When the key 28 is turned in the opposite direction, the cam surface 38 is drawn out from under the ball bearing 40 so that the ball bearing will be nudged out of the groove 30 when the housing is withdrawn from the retainer.

Two important features of the preferred embodiment of FIGS. 1-4 will now be discussed. First, compared to other locking assemblies, the assembly of the present invention has a relatively low profile because the axis 36 of the lock is perpendicular to the axis 21 of the bolt 18.

Second, compared to other locking assemblies, the retainer 22 of the present invention extends quite a long way inside of the housing 24, whereby any attempt to pry the housing from the retainer will be opposed by the combined strength of the housing and the retainer.

In the preferred embodiment, a ball bearing 40 is used to selectively couple the housing to the retainer. However, in other embodiments the ball bearing 40 could be replaced by a shuttle of a different shape, for example, by a capsule-shaped piece or by an elongated piece. Such other shaped pieces are deemed to be comprehended within the present invention.

It is in the use of the ball bearing 40 or similar piece that the present invention differs notably from those prior art locking assemblies in which the axis of the lock is parallel to the axis of the bolt. In those devices, typically a finger extends from the shaft 32 perpendicular to the axis 36 of the lock, and the finger selectively extends into a groove 30 on a retainer. The finger prevents the housing from being slid from the retainer 22. For this reason, the finger must move in a plane that is perpendicular to the axis 36 of the lock and that is also perpendicular to the axis 21 of the bolt. This requires the axis of the lock to be parallel to the axis of the bolt, to avoid the transmission of stresses to the lock.

This limitation of prior art devices has been overcome by the present inventor's use of the ball bearing 40 or shuttle of a different shape. This innovation permits the axis 36 of the lock to be located at any desired angle so long as it lies in an imaginary plane that is perpendicular to an imaginary line that is perpendicular to the axis 21 of the bolt. If the axis of the lock is perpendicular to the axis of the bolt, the device has a low profile as in the embodiment of FIGS. 1-4, and this is preferred for general use. However, in some situations, convenience or spatial limitations may indicate that some other angle would be preferable. Fortunately, these other angles are comprehended within the scope of the present invention, but are not achievable with the prior art devices.

Another advantage of using a shuttle piece such as the ball bearing 40, as taught by the present inventor, is very important but less readily appreciated by persons lacking hands-on experience. In certain prior art devices that do not use a shuttle piece, a finger or a cam extends from the shaft of the lock, and in order to be selectively movable into a groove on a retainer, the finger or cam must extend radially beyond the envelope of the lock. Consequently, the finger or cam will not pass through the bore in which the lock is contained; it is necessary to provide a separate opening in the housing, opposite the bore for the lock, into which the finger or cam is inserted. Not only does this involve additional manufacturing steps, it also makes the device weaker and more susceptable to dirt and tampering. In contrast, when a shuttle is used, as taught by the present inventor, the cam 34, the ball bearing shuttle 40 and the lock 26 can all be inserted into a single blind bore in the housing, after which the lock is pinned within the bore, thereby preventing subsequent removal of the lock, the cam and the shuttle.

Figure 5:
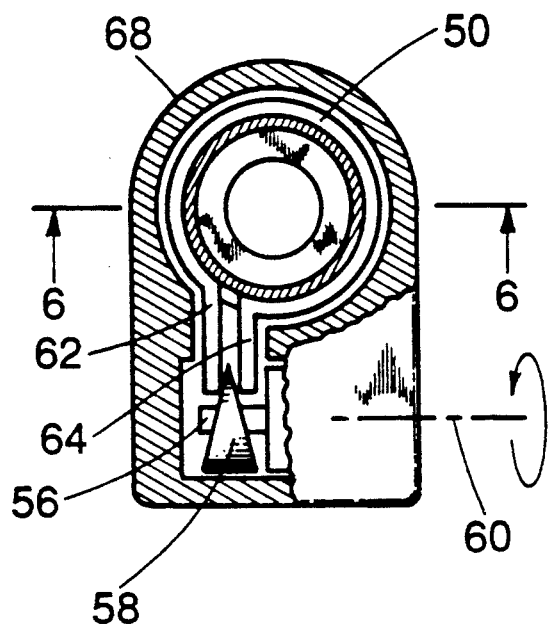
FIG. 5 is a front elevational cross-sectional view of a second embodiment of the present invention.
Figure 6:
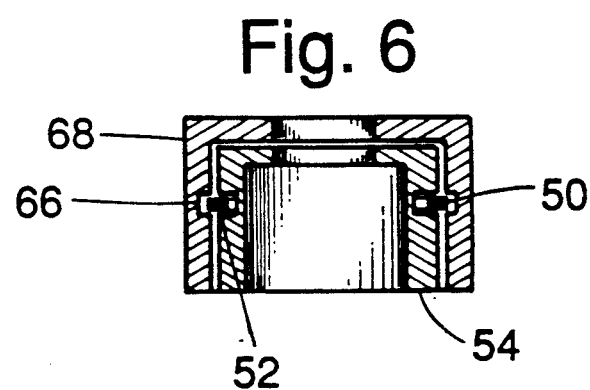
FIG. 6 is a fractional side elevational cross-sectional view in the direction 6—6 indicated in FIG. 5; and, FIG. 7 is a front elevational view partly in cross-section of a third embodiment of the present invention.
Figure 7:
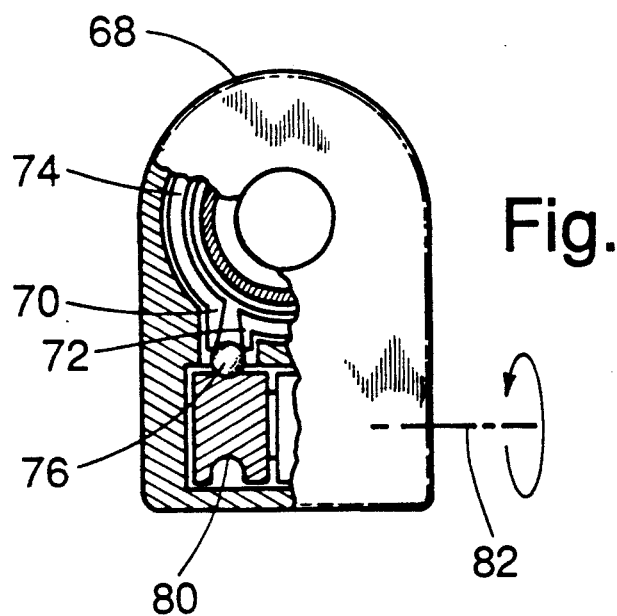

FIGS. 5 through 7 show some alternative embodiments of the present invention.

In the alternative embodiment of FIGS. 5 and 6, a snap ring 50 normally fits partially within a groove 52 on the retainer 54, as shown in FIG. 6. The snap ring includes end tabs 62 and 64.

When the key is turned in the lock, as indicated in FIG. 5, the shaft 56 turns a spreader portion 58 of varying thickness about the axis 60, thereby forcing apart the ends 62 and 64 of the snap ring and causing the snap ring to expand sufficiently that it is no longer retained on the retainer, but instead is partially contained in a groove 66 on the housing 68. At that point, the housing 68 may be removed from the retainer 54, thereby permitting access to the nut or bolt head.

A different alternative embodiment is shown in FIG. 7. There the end tabs 70 and 72 of the snap ring 74 are forced apart by a ball bearing 76 that rides in an eccentric race 80. The embodiment of FIG. 7 is seen to incorporate the shuttle teaching, described above, into the snap ring embodiment of FIG. 5. Accordingly, in the embodiment of FIG. 7, the axis 82 of the lock could be oriented in other directions including parallel to the axis of the bolt. In contrast, in the embodiment of FIG. 5, the axis 60 of the lock must always be perpendicular to (but displaced from) the axis of the bolt.

Thus, there has been described a preferred embodiment and two alternative embodiments of a locking assembly for denying access to a nut or bolt head. Because the axis of the lock is perpendicular to the axis of the bolt, the locking assembly of the preferred embodiment presents a lower profile when installed, thereby making it more difficult to wrench off. Additional strength results from the fact that the retainer is almost as deep in the axial direction as the housing, so that the retainer reinforces the housing when an attempt is made to pry the housing away from the article that is secured.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. An article for preventing unauthorized access to a nut that has been screwed onto a bolt, comprising:
  a cup-shaped retainer including an end plate perpendicular to the bolt having an aperture for the bolt to pass through, and including a shroud coaxial with the bolt and having an outwardly-facing cylindical surface and extending from the end plate away from the head of the bolt to encircle and contain the nut, the shroud having an indentation in its outwardly-facing cylindrical surface and being secured on the bolt by the nut;
  a housing shaped to fit over the shroud of said retainer so that together said retainer and said housing completely surround the nut;
  a lock having an axis and mounted within said housing in such a position that when said housing is fitted over the shroud of said retainer the axis of said lock lies in an imaginary plane that is perpendicular to an imaginary line that is perpendicular to the axis of the bolt;
  said lock further including a shaft that is rotatable about the axis of said lock through the use of a key, said shaft including a cam that rotates with the shaft when the key is turned in said lock; and,
  a shuttle, mounted within said housing so as to be forced by said cam into engagement with the indentation of the shroud of said retainer at one rotational position of said cam, whereby said housing is engaged to said retainer, and so as to be released by said cam at another rotational position of said cam, whereby said housing is disengaged from said retainer to permit said housing to be removed from said retainer to permit access to the nut.

2. The article of claim 1 wherein said indentation encircles the outwardly-facing cylindrical surface, whereby said housing can be engaged to said retainer at any desired angular position around the axis of the bolt.

3. An article for preventing unauthorized access to a bolt head, comprising:
  a cup-shaped retainer including an end plate perpendicular to the bolt having an aperture for the bolt to pass through, and including a shroud coaxial with the bolt and having an outwardly-facing cylindrical surface and extending from the end plate in a direction away from the shank of the bolt to encircle and contain the bolt head, said shroud having an indentation in its outwardly-facing cylindrical surface and being secured on the bolt by the bolt head;
  a housing shaped to fit over the shroud of said retainer so that together said retainer and said housing completely surround the bolt head;
  a lock having an axis and mounted within said housing in such a position that when said housing is fitted over the shroud of said retainer the axis of said lock lies in an imaginary plane that is perpendicular to an imaginary line that is perpendicular to the axis of the bolt;
  said lock further including a shaft that is rotatable about the axis of said lock through the use of a key, said shaft including a cam that rotates with the shaft when the key is turned in said lock; and,
  a shuttle, mounted within said housing so as to be forced by said cam into engagement with the indentation of the shroud of said retainer at one rotational position of said cam, whereby said housing is engaged to said retainer, and so as to be released by said cam at another rotational position of said cam, whereby said housing is disengaged from said retainer to permit said housing to be removed from said retainer to permit access to the bolt head.

4. The article of claim 3 wherein said indentation encircles the outwardly-facing cylindrical surface, whereby said housing can be engaged to said retainer at any desired angular position around the axis of the bolt.

5. An article for preventing unauthorized access to a nut that has been screwed onto a bolt, comprising:
  a cup-shaped retainer including an end plate perpendicular to the bolt having an aperture for the bolt to pass through, and including a shroud coaxial with the bolt and having a hollow cylindrical shape, having an outwardly-facing cylindrical surface and extending from the end plate away from the head of the bolt to encircle and contain the nut, the shroud having a groove in its outwardly-facing cylindrical surface that encircles the shroud, said retainer secured on the bolt by the nut;
  a housing shaped to fit over the shroud of said retainer so that together said retainer and said housing completely surround the nut;
  a snap ring mounted within said housing and having a normal unexpanded diameter sized to engage the groove in the shroud of said retainer and having an expanded diameter that clears the outwardly-facing cylindrical surface of the shroud, said snap ring having two end tabs;
  a lock having an axis and mounted within said housing in such a position that when said housing is fitted over the shroud of said retainer, the axis of said lock lies in an imaginary plane that is perpendicular to an imaginary line that is perpendicular to the axis of the bolt whereby said lock does not protrude from said housing in the direction of the axis of the bolt;

said lock further including a shaft that is rotatable about the axis of said lock through the use of a key, said shaft including a cam that rotates with the shaft when the key is turned in said lock;

a shuttle mounted within said housing so as to be forced by said cam at one rotational position of said cam between the two end tabs of said snap ring, thereby expanding said snap ring so that it has the expanded diameter required to clear the outwardly-facing cylindrical surface of said shroud, whereby said housing is disengaged from said retainer to permit access to the nut, said shuttle mounted within said housing so as to be withdrawn at another rotational position of said cam from between the two end tabs of said snap ring so as to permit said snap ring to return to its normal diameter whereby said snap ring engages the groove in the shroud thereby securing said housing to said retainer to prevent unauthorized access to the nut.

6. The article of claim 5 wherein said housing includes an aperture to pass a portion of the bolt that extends beyond the nut.

7. The article of claim 5 wherein said shuttle is spherical.

8. An article for preventing unauthorized access to a bolt head, comprising:

a cup-shaped retainer including an end plate perpendicular to the bolt having an aperture for the bolt to pass through, and including a shroud coaxial with the bolt and having a hollow cylindrical shape, having an outwardly-facing cylindrical surface and extending from the end plate away from the shank of the bolt to encircle and contain the bolt head, the shroud having a groove in its outwardly-facing cylindrical surface that encircles the shroud, said retainer secured on the bolt by the bolt head;

a housing shaped to fit over the shroud of said retainer so that together said retainer and said housing completely surround the bolt head;

a snap ring mounted within said housing and having a normal unexpanded diameter sized to engage the groove in the shroud of said retainer and having an expanded diameter that clears the outwardly-facing cylindrical surface of the shroud, said snap ring having two end tabs;

a lock having an axis and mounted within said housing in such a position that when said housing is fitted over the shroud of said retainer, the axis of said lock lies in an imaginary plane that is perpendicular to an imaginary line that is perpendicular to the axis of the bolt;

said lock further including a shaft that is rotatable about the axis of said lock through the use of a key, said shaft including a cam that rotates with the shaft when the key is turned in said lock;

a shuttle mounted within said housing so as to be forced by said cam at one rotational position of said cam between the two end tabs of said snap ring, thereby expanding said snap ring so that it has the expanded diameter required to clear the outwardly-facing cylindrical surface of said shroud, whereby said housing is disengaged from said retainer to permit access to the bolt head, said shuttle mounted within said housing so as to be withdrawn at another rotational position of said cam from between the two end tabs of said snap ring so as to permit said snap ring to return to its normal diameter whereby said snap ring engages the groove in the shroud thereby securing said housing to said retainer to prevent unauthorized access to the bolt head.

9. The article of claim 8 wherein said shuttle is spherical.

10. An article for preventing unauthorized access to a nut that has been screwed onto a bolt, comprising:

a cup-shaped retainer including an end plate perpendicular to the bolt having an aperture for the bolt to pass through, and including a shroud coaxial with the bolt and having a hollow cylindrical shape, having an outwardly-facing cylindrical surface and extending from the end plate away from the head of the bolt to encircle and contain the nut, the shroud having a groove in its outwardly-facing cylindrical surface that encircles the shroud, said retainer secured on the bolt by the nut;

a housing shaped to fit over the shroud of said retainer so that together said retainer and said housing completely surround the nut;

a snap ring mounted within said housing and having a normal diameter that engages the groove of said retainer and having an expanded diameter that clears the cylindrical surface of said shroud, said snap ring having two end tabs;

a lock having an axis and mounted within said housing in such a position that when said housing is fitted over the shroud of said retainer, the axis of said lock lies in an imaginary plane that is perpendicular to the axis of the bolt;

said lock further including a shaft that is rotatable about the axis of said lock through the use of a key, said shaft including a spreader portion, the axial thickness of which varies with the angular position around said shaft, said spreader portion extending between the two end tabs of said snap ring, so that at one rotational position of said shaft, said spreader portion forces the two end tabs apart, thereby expanding said snap ring so that it has the expanded diameter required to clear the outwardly-facing cylindrical surface of said shroud, whereby said housing is disengaged from said retainer to prevent access to the nut, and so that at another rotational position of said shaft, said spreader portion is too thin in the axial direction to force the two end tabs apart, so that said snap ring remains at its normal diameter engaging the groove in the shroud of said retainer, thereby securing said housing to said retainer to prevent unauthorized access to the nut.

11. The article of claim 10 wherein said housing includes an aperture to pass a portion of the bolt that extends beyond the nut.

12. An article for preventing unauthorized access to a bolt head, comprising:

a cup-shaped retainer including an end plate perpendicular to the bolt having an aperture for the bolt to pass through, and including a shroud coaxial with the bolt and having a hollow cylindrical shape, having an outwardly-facing cylindrical surface and extending from the periphery of the end plate away from the shank of the bolt to encircle and contain the bolt head, the shroud having a groove in its outwardly-facing cylindrical surface that encircles the shroud, said retainer secured on the bolt by the bolt head;

a housing shaped to fit over the shroud of said retainer so that together said retainer and said housing completely surround the bolt head;

a snap ring mounted within said housing and having a normal unexpanded diameter sized to engage the groove in the shroud of said retainer and having an expanded diameter that clears the outwardly-facing cylindrical surface of the shroud, said snap ring having two end tabs;

a lock having an axis and mounted within said housing in such a position that when said housing is fitted over the shroud of said retainer, the axis of said lock lies in an imaginary plane that is perpendicular to the axis of the bolt;

said lock further including a shaft that is rotatable about the axis of said lock through the use of a key, said shaft including a spreader portion, the axial thickness of which varies with the angular position around said shaft, said spreader portion extending between the two end tabs of said snap ring, so that at one rotational position of said shaft, said spreader portion forces the two end tabs apart, thereby expanding said snap ring so that it has the expanded diameter required to clear the outwardly-facing cylindrical surface of said shroud, whereby said housing is disengaged from said retainer to allow access to the bolt head, and so that at another rotational position of said shaft, said spreader portion is too thin in the axial direction to force the two end tabs apart, so that said snap ring remains at its normal diameter engaging the groove in the shroud of said retainer, thereby securing said housing to said retainer to prevent unauthorized access to the bolt head.

* * * * *